N. W. Kingsley,
Hay Fork.

No. 94,319.  Patented Aug. 31, 1869.

Witnesses

Inventor
Nathan W. Kingsley
By his Atty

United States Patent Office.

NATHAN W. KINGSLEY, OF SWANSEA, MASSACHUSETTS.

Letters Patent No. 94,319, dated August 31, 1869.

IMPROVEMENT IN HORSE HAY-FORKS.

The Schedule referred to in these Letters Patent and making part of the same.

*To all whom it may concern:*

Be it known that I, NATHAN W. KINGSLEY, of the town of Swansea, in the county of Bristol, and State of Massachusetts, have invented a certain new and useful Horse Hay-Fork.

My invention consists in the novel construction and arrangement of the parts composing a horse hay-fork, by means of which the hay to be raised is firmly bound by the action of the hoisting-rope before the process of hoisting is actually begun; and I do hereby declare that the following specification, taken in connection with the drawings furnished, and forming a part of the same, is a true, clear, and exact description thereof, reference being had to the drawings.

Identical parts in all the figures are lettered alike.

A is the stock or handle. At the end toward the fork it is constructed with a long tenon, the upper edge of which is provided with ratchet-teeth or notches.

B is the shank of the fork proper, and is slotted to receive longitudinally the long tenon of handle A, before described.

Figure 2:
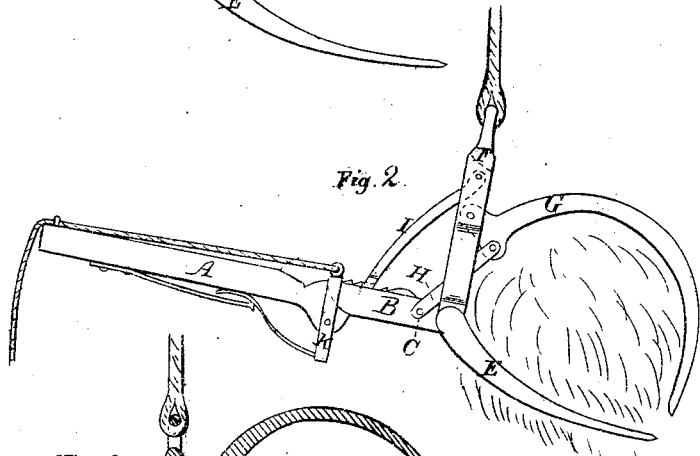
Figure 2 represents the same, closed and loaded.
Figure 3:
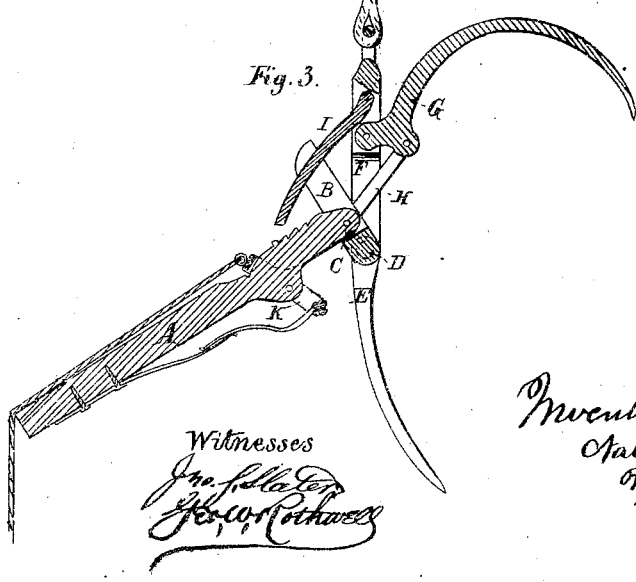
Figure 3 represents the same, in longitudinal vertical section, opened for discharging.

C is a pin, passing through the parts B and C, hinging them together, shown in figs. 2 and 3.

D is the back of the fork proper, and is securely fastened to the shank B, at right angles thereto.

E and E are the lifting-tines of the fork. They are rigidly attached to the back D, which is in turn attached to shank B. In regular construction, the tines, back D, and shank B, might be made in one piece.

F is the lifting-arm, to which the hoisting-rope is attached. This lifting-arm is forked at its lower end, and loosely, yet securely, embraces the back D on both sides of the shank B.

G is the holding or binding-tine. It is jointed by a pin to the lifting-arm, and also by a link, H, to the shank B, by pin C.

It will be observed that the link H, by its operation, secures a rapid movement of the holding-tine G, forward and downward, firmly binding the contents of the fork within the grasp of the tines while the lifting-arm is being raised. Should it be deemed desirable, this holding-tine may be made with two, three, or more prongs, to correspond with the number of lifting-tines.

I is a pawl, pivoted at its upper end to the lifting-arm F. Its lower end, when the arm F is vertical and the fork loaded, is in conjunction with the notches on the upper edge of the tenon of the handle A. Its purpose is to maintain the fork, when loaded, in a proper position for retaining the contents.

K is the tripping-device. It consists of a metal collar, of oblong form, embracing the handle A, and pivoted at its centre thereto.

By means of pressure from springs obviously arranged, the collar is continually kept in a position at right angles with the handle.

It will be observed that the outer ends of the shank B are so rounded that when they are brought into contact from above with the collar K, the same is moved on its pivot, admitting of the passage of the shank to its proper position, the collar flying back by reason of the action of the spring, thus rendering the lifting-tines and the handle A rigid, as if in one piece.

To the upper end of the collar is attached a cord, leading therefrom through staples along and beyond the end of the handle to the hand of the person operating.

The mode of operation of my apparatus is obvious to persons skilled in the art.

Figure 1:
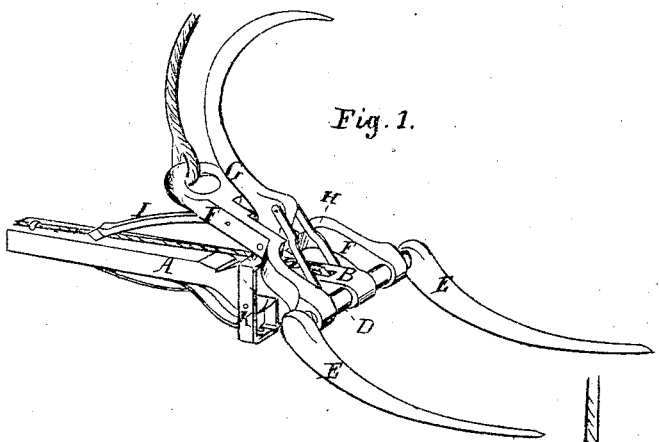
Figure 1 represents one of my horse hay-forks, in perspective, open and ready for loading.

A fork, open, as shown in fig. 1, is inserted by means of the handle A, into the hay to be raised, as far as possible. The lifting-rope then being pulled, raises the lifting-arms F, which causes the holding-tine G to move rapidly forward and downward, embracing and firmly holding the hay resting on the lifting-tines.

The pawl I is then placed in contact with one of the notches in the handle, after which the hoisting can be done.

When it is desirable to discharge the load, the rope attached to the collar K is pulled, which permits the lifting-tines to fall and release the pawl and holding-tine.

I am aware that a great variety of horse hay-forks has heretofore been constructed and used.

I am not aware, however, that prior to my invention any have been constructed with a holding-tine or tines attached to and operated by the lifting-arm.

Having thus described my invention,

I claim as new, and desire to secure by Letters Patent—

1. In combination with the lifting-arm F, handle A, and pawl I, the holding-tine G, operated by the link-connection H, substantially as shown and described, for the purposes specified.

2. The improved horse hay-fork herein described, consisting of the handle A, shank B, lifting-tines E, holding-tine G, link-connection H, lifting-arm F, and pawl I, provided with any suitable tripping-device, and arranged to operate substantially as shown and described, for the purposes specified.

NATHAN W. KINGSLEY.

Witnesses:
AMOS T. KINGSLEY,
D. B. GARDNER.